April 3, 1962   W. REICHE ET AL   3,027,819
PHOTOGRAPHIC ONE-EYE REFLEX CAMERA
Filed May 20, 1959   3 Sheets-Sheet 3

United States Patent Office 3,027,819
Patented Apr. 3, 1962

3,027,819
PHOTOGRAPHIC ONE-EYE REFLEX CAMERA
Wilhelm Reiche, Braunschweig, Karl-Gunter Behr, Wilhelmshaven, and Werner Schacht, Braunschweig, Germany, assignors to Voigtländer A.G., Braunschweig, Germany, a corporation of Germany
Filed May 20, 1959, Ser. No. 814,559
Claims priority, application Germany Sept. 19, 1958
8 Claims. (Cl. 95—42)

This invention relates to one-eye reflex cameras and it has particular relation to such cameras provided with an objective shutter, a control mechanism for transport or feed of the film, setting of the shutter and movement of the mirror and the light hood.

In viewing position of such cameras the objective shutter is open and the light rays passing therethrough are deflected into a finder device, for example a ground-glass plate, by means of a mirror tilted into the path of rays. At the same time, the light hood covers the image window of the camera. At the start of the running down of the shutter—which takes place upon operation of the shutter release means—the shutter is closed for a short period of time so that the mirror and the light hood can shift to the picture taking position, whereupon the shutter is opened and closed again in order to bring about exposure. During the subsequent setting of the shutter, the mirror and the light hood must be returned to the viewing position and must reach the latter before the shutter is opened again for observation at the end of the setting step. It is, therefore, necessary to adjust to each other the movements of the mirror and of the light hood and the running down functions of the shutter. Numerous control mechanisms, which may be of entirely different construction, have been suggested previously in order to bring about the beforementioned adjustment or adaptation.

The main object of the present invention is to provide a particularly simple control mechanism of the above-mentioned type.

It is contemplated according to the present invention, that in a camera of the abovementioned type that part of the shutter setting mechanism which is directly coupled with a pinion seated on the setting shaft of the shutter, should be at the same time the control means for the mechanism which brings about movement of the reflex mirror and the light hood.

This part of the shutter setting mechanism is preferably a control slide which has a toothed rack adapted to be engaged by the pinion seated on the setting shaft of the shutter and which carries, in addition, a control cam for causing movement of the mechanism for controlling the reflex mirror and the light hood. This control slide is preferably connected with the elements for driving the same, of the shutter setting mechanism, in such a manner that it takes part only in the movement for effecting setting of the shutter; remains in the position reached by it at the completion of setting the shutter, whereafter it is returned into its initial position by the setting shaft when the latter turns in backward direction in the running down of the shutter. Movement of the control slide for effecting setting of the shutter is preferably brought about in such a manner that a setting slide, which is rigidly connected with a reciprocable film transport handle, acts on the control slide and displaces the same by means of a nose or the like seated thereon. However, the invention is not limited to cameras provided with a film feed handle moving to and fro and can be applied also to cameras, the handle of which moves in one direction only. In such a case, conventional means have to be used in order to cause the setting slide to carry out a movement to and fro during the film transport movement of the handle.

The mechanism for bringing about movement of the mirror and of the light hood, which is operated by movements of the control slide, can be constructed in various ways. Preferably, this mechanism should carry out—like the mirror and the light hood—a movement to and fro. Such movement can be derived from a control cam carried by the control slide, in such a manner that one arm of a two-armed lever is brought in connection with the control cam, for example by engaging the control cam with a bolt or the like, seated on said arm. In order to bring about this movement, said cam can consist, in simplest manner, of two cam members—which are arranged, in the direction of motion of the control slide, rectilinearly and parallel, but staggered relative to each other—and a third cam member which connects said two cam members with each other.

The mechanism operated by this control cam should have the effect that the mirror and the light hood be held in one of their end positions, for example in the viewing position of the camera; pass to the picture taking position upon release of the shutter and return again to their initial position subsequently. It is a particularly essential advantage if these movements of the mirror and of the hood, are derived from a single member acting on them. Therefore, according to a preferred embodiment of the invention, the lever coupled with the control slide, is connected over intermediate members with a locking member which simultaneously acts on the carrier for the reflex mirror as well as on the light hood and locks, in one end position of the control slide, the mirror carrier and the light hood, in one of their end positions, preferably in the viewing position of the camera. Due to the movement of this locking member—which takes place in dependence on the movement of the control slide—the mirror carrier and the light hood will then be unlocked so that—under the effect of springs acting on them—they can return in the other of their end positions, preferably the picture taking position of the camera. From this last mentioned position, they are returned by the return movement of the locking member (which takes place in dependence on the movement of the control slide) to their initial position and are locked there.

According to an advantageous further modification of the invention, it is contemplated that a member inserted in the connection between the control slide and the locking member, cooperates with a locking device acting on the film transport handle in such a manner, that the locking device is brought to the position for releasing movement of the film transport handle, due to displacement of the mechanism which occurs during running down of the shutter. Furthermore, the setting slide and the shutter release means can be also brought in mechanical connection with each other in such a manner that operation of the shutter release means is possible only in rest position of the setting slide.

The appended drawings illustrate, by way of example, some preferred embodiments of and best modes for carrying out the invention, to which the invention is not limited.

In the drawings

Figure 1:
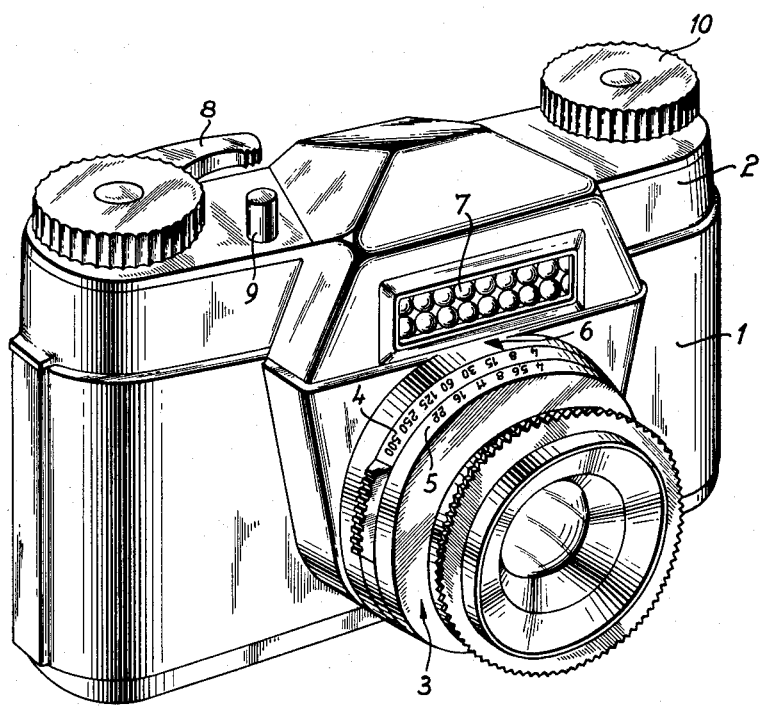
FIG. 1 is a perspecitve view of a camera containing the devices embodying the present invention.

The camera illustrated in the drawings is a one-eye reflex camera containing a tiltable mirror which is arranged in the path of rays between the picture taking objective and the light-sensitive layer and deflects the light rays, when tilted into the path of the latter, to the finder device. After tilting the mirror out of the path of light rays, the latter can act on the light-sensitive layer. Cameras of this type have been known in the art.

Referring now to the drawings in detail, in FIG. 1 the camera body is denoted by reference numeral 1 and the camera cap covering the upper narrow side of this body, is denoted 2. The objective mount 3 forms a structural unit with the objective shutter, the adjusting rings of which for exposure time and diaphragm are denoted 4 and 5. The scales for exposure time and diaphragm, which are located on these adjusting rings, cooperate with a common stationary mark 6. Above the objective mount 3, a photocell 7 of an electric exposure meter built in in the camera cap 2, is arranged. Reference symbol 8 denotes the operating lever of the control mechanism (described hereinafter) for the film transport, setting of the shutter and movement of the mirror. Near the operating lever or handle 8, the shutter release key 9 can be seen. On the other end of the camera cap 2, a control knob 10 is shown.

Figure 2:
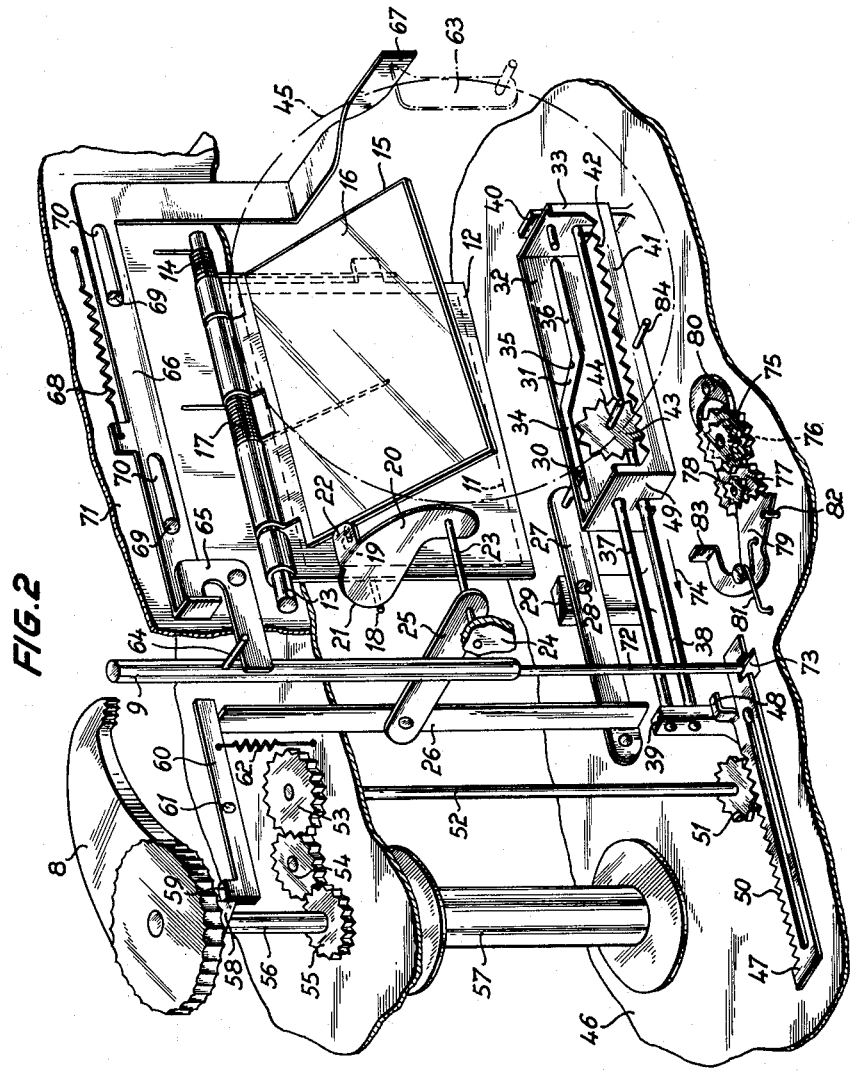
FIG. 2 is likewise a perspective view of the camera shown in FIG. 1, the camera walls being broken away so that the devices according to the invention are visible.

FIGURE 2 shows parts of the control mechanism in a condition, in which the film transport and setting of the shutter are accomplished and the camera is in the position for observing an image.

The image aperture or window 11 of the camera is thereby covered by a light hood 12, which is tiltably arranged on a stationary shaft 13 in the camera and is under the effect of a spring 14, which tends to tilt the hood 12 away from the window 11 to the open position. Moreover, on the shaft 13 a carrier 15 for the mirror 16 is arranged, which—in the position shown—is located in the path of rays incident through the objective and the open shutter and deflects the rays to the finder device (not shown in detail), e.g. a ground-glass plate. The mirror carrier 15 is likewise under the effect of a spring 17, which tends to tilt said carrier out of the path of rays. The light hood 12 and the mirror carrier 15 are held in the position shown by pins 18 and 19, which are seated thereon and lie against a locking member 20. While the pin 18 of light hood 12 lies against the cam-shaped edge 21 of the locking member 20, pin 19 of the mirror carrier 15 is overlapped by a flap 22 bent from locking member 20.

Locking member 20 is fixedly seated on a shaft 23, which is rotatable in a stationary bearing 24 of the camera and also carries a lever 25 fixedly connected therewith. Lever 25 is linked to a sliding lever 26, which, in turn, is rotatably arranged on a two-armed lever 27. Lever 27 is tiltably pivoted about a pin 28 located in a stationary bearing 29 of the camera and carries on its free arm a bolt 30, which engages a control cam 31, which latter is located in a wall 32 of a frame-like control slide 33. The control cam 31 is composed of three contiguous portions 34, 35 and 36, of which 34 and 36 extend rectilinearly and parallel relative to each other, but at different levels within the wall of the control slide 33, while the cam piece 35 forms a connection between pieces 34 and 36.

The control slide 33 is slidably arranged on two guide rods 37 and 38, the ends of which are fixed in bearings 39 and 40 which are stationary in the camera. Wall 41 of the control slide 33 carries a toothed rack 42, which is engaged by a pinion 43 seated on setting shaft 44 of the camera shutter. The setting shaft 44 projects from the rear wall (turned toward the camera body) of the shutter casing. The rear wall of the shutter casing is indicated in FIG. 2 by the dash-and-dot line 45.

Besides, on a camera wall 46 a setting slide 47 is arranged, a nose 48 of which is bent in such a manner that it can come in engagement with wall 49 of the control slide 33. A rack 50 of the setting slide 47 is engaged by a pinion gear 51, which is fixedly connected with control lever 8, by means of shaft 52, gears 53, 54, 55 and shaft 56 and is moved when lever 8 is tilted. Seated on shaft 56 is also a film-take-up spool 57, which is connected in conventional manner therewith by means of a one-way coupling, so that spool 57 participates in the rotation of shaft 56 only in the meaning of the film feed, but does not turn when the lever 8 is tilted back.

Seated on the surface turned toward the camera cap 2, of the handle 8 is a locking cam 58. Provided on a locking lever 60—which is tiltably arranged about pin 61 and held by a draw spring 62 against the free end of sliding lever 26—is a nose 59, which extends through camera cap 2 and projects into the range of movement of said cam 58.

The connection between shutter release key 9 and shutter release lever 63 seated on the shutter rear wall 45, is established by a pin 64 seated on key 9, a lever 65, which lies against the latter, and a release key slide 66, which, in turn, lies against lever 65. Slide 66 has a bent arm 67, against which the shutter release lever 63 lies. Slide 66 is under the effect of a draw spring 68 and is arranged by means of a pin and slot guide 69, 70 in wall 71.

An extension 72 of shutter release key 9 extends up to setting slide 47, which is provided with a recess 73, and this recess can be entered by extension 72 during the release movement of key 9. When said recess 73 is not in the range of movement of extension 72, i.e. when the setting slide 47 during its shutter setting movement is in a position other than that shown, operation of shutter release key 9 is prevented.

Arranged on the camera wall 46 is also a braking device by means of which movement of control slide 33, which takes place in a release of the shutter, can be braked within a predetermined range. The braking device is formed by cog wheels 75, 76, 77 and 78, the rotation of which is brought about by tilting a toothed lever 79 and the braking of which is brought about by an anchor 80, which engages cog wheel 75. The toothed lever 79 is under the effect of a spring 81, which tends to hold lever 79 in engagement with a stop pin 82. A stop flap 83 bent from lever 79 projects into the range of movement of a pin 84 seated on control slide 33. When this pin 84 contacts flap 83, the toothed lever 79 is tilted, whereby such tilting is braked by the rotating of cog wheels 75—78 and engagement of cog wheel 75 by anchor 80.

The camera shutter—which does not form part of the present invention—is conventionally constructed in such a manner that during its setting movement—which is brought about by turning setting shaft 44—in addition to setting the shutter mechanism, the shutter sectors are opened for observation of the image. Upon release of the shutter, which takes place by tilting shutter release 63, the setting shaft 44 is turned back to its uncocked position. Thereby, first the shutter sectors are closed and they are then opened again for the period of the adjusted exposure time, when mirror 16 and light hood 12 move from the observation position shown, to the picture taking position.

The camera mechanism described above is constructed in accordance with these shutter functions.

As already mentioned above, FIG. 2 illustrates the mechanism in the viewing or observing position of the camera. If in this position the shutter is released by operation of the shutter release key 9, the setting shaft 44 is turned so that the pinion 43 seated thereon moves the control slide 33 in the direction of arrow 74. During closing of the shutter, which thereby takes place first, with the exception of control slide 33, the parts remain in the position shown in the drawing, because part 34 of the cam seated in control slide 33, does not exert yet a displacing movement on the bolt 30 engaging said slide. When the shutter sectors are closed, the control slide 33 will have reached a position, in which the bolt 30 starts to enter cam portion 35. During its passage through this portion 35, the bolt 30 and together with it lever 27, sliding lever 26, lever 25 and thus locking member 20, are moved in such a manner that said locking member releases with its flap 22 pin 19 provided on mirror carrier 15 and, shortly thereafter, releases with its edge 21, pin 18 of the light hood 12. The mirror carrier 15 and the light hood 12 can swing to the picture taking position under the effect of springs 17 and 14, respectively, acting thereon.

Figure 3:
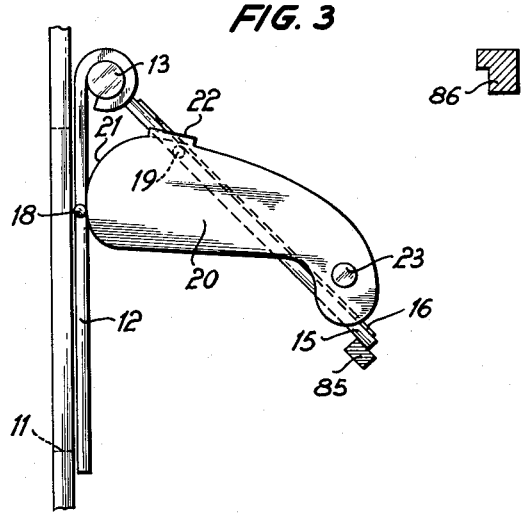
FIG. 3 is a side view of the means for displacement of the reflex mirror and the light hood, the parts being shown in the sighting position of the camera.
Figure 4:
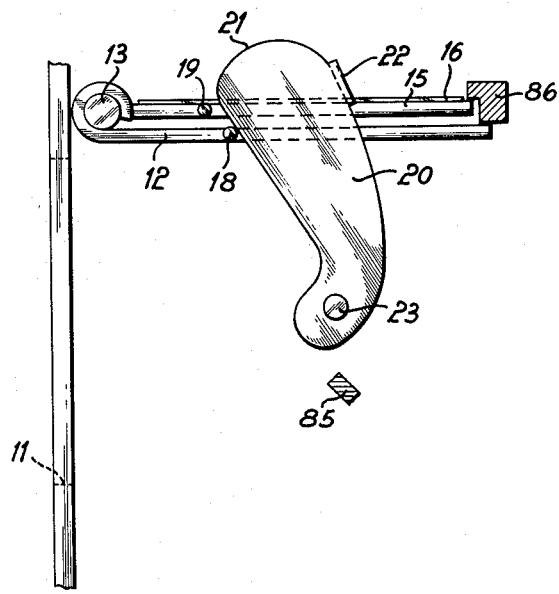
FIG. 4 illustrates the parts shown in FIG. 3 in their position in the picture taking condition of the camera.

This can be seen particularly in FIGS. 3 and 4. In the viewing or observing position shown in FIG. 3, it can be seen that locking member 20 acts with its edge 21 on pin 18 of light hood 12 and holds the latter in firm engagement with the camera wall which carries the image aperture 11. Simultaneously, by flap 22, which is bent from locking member 20, pin 19 seated on mirror carrier 15 is overlapped, whereby mirror carrier 15 is held in firm engagement with stop 85 which determines its viewing or observing position.

Upon its tilting to the position shown in FIG. 4, locking member 20 releases pins 19 and 18 so that mirror carrier 15 and light hood 12 can swing to the exposure position which is determined by their engagement with the common stop 86.

In order to make it sure that this swinging of the mirror carrier 15 and light hood 12 to the initial position, is safely carried out before the shutter opens for exposure, a braking of movement of control slide 33 by means of the braking device takes place when the bolt 30 moves within cam part 36. When the bolt 30 moves in the last part of cam piece 36, pin 84, which is seated on control slide 33, reaches stop flap 83, whereby braking mechanism 75 to 80 is started and lever 79—which thus swings with braking—reduces the velocity of movement of control slide 33. Shortly before control slide 33 reaches its end position, the shutter opens and closes for a period of time corresponding to the adjustment of ring 4 (FIG. 1). When the shutter is run down, control slide 33 will be in engagement with bearing 39.

Upon movement of slide lever 26, the free end of the latter causes tilting of locking lever 60 so that nose 59 of the locking lever emerges from the range of movement of locking cam 58. If operating lever 8—which is now released—is tilted, in addition to the film transport, a movement of the setting slide 47 will take place over gears 55, 54, 53, shaft 52 and cog wheel 51. The nose 48 of setting slide 47, which lies against wall 49 of control slide 33, causes displacement of the latter again to the setting position shown in the drawing. During turning of shutter setting shaft 44—which thereby takes place—the shutter is cocked. During passage of bolt 30 through cam piece 35, displacement of parts 27, 26, 25 and 23, takes place again. Thereby, locking member 20 engages with its flap 22 and its edge 21, pins 19 and 18, respectively, whereby mirror carrier 15 and light hood 12 are passed again to the position shown in FIGS. 2 and 3. Locking lever 60 can likewise enter again, after return of the operating lever 8 to its initial position, to the locking position shown in the drawing and thus prevent repeated operation of lever 8. Furthermore, the braking device acting on control slide 33 likewise returns under the effect of spring 81, to the position shown in the drawing, directly at the start of the setting movement. While control slide 33 is held, in the set position of the shutter by the then arrested setting shaft 44 in the position shown in the drawing, the setting slide 47 moves upon return of operating lever 8, again to the initial position shown in the drawing.

It will be understood from the above that this invention is not limited to the specific constructions, arrangements and steps and other details specifically described above and illustrated in the drawings and can be carried out with various modifications without departing from the scope of the invention as defined in the appended claims.

What is claimed is:

1. In a single lens reflex camera of the general type having a lens, an image aperture opposite said lens, a shutter mechanism having a released condition corresponding to exposure of light through said lens to said image aperture and a cocked condition corresponding to viewing condition of the camera, a viewer, a mirror movable between viewing position corresponding to the cocked condition of said shutter mechanism in which said mirror reflects light passing through said lens to said viewer and exposure position corresponding to the released condition of said shutter mechanism in which said mirror is clear of the light passing through from said lens to said image aperture, a hood movable between image aperture blocking position when said mirror is in viewing position and viewer blocking position when said mirror is in exposure position, a shutter release member for coupling to said shutter mechanism for picture exposure, and a shutter cocking member for coupling to said shutter mechanism for placing it in cocked condition; the improvement in control mechanism comprising a slide mounted on said camera for linear reciprocation between a limiting viewing position and a limiting exposure position; and oscillatory member for coupling to the shutter mechanism and movable between a first position, corresponding to the cocked condition of the shutter mechanism, and a second position, corresponding to the released condition of the shutter mechanism; means coupling said oscillatory member to said slide for moving the latter in a first direction from its limiting viewing position to its limiting exposure position as said oscillatory member is moved from its first position to its second position; lost motion means coupling said slide to the mirror and the hood for moving the mirror to its exposure position and the hood to its viewer blocking position during an intermediate portion of the movement of said slide in said first direction; an abutment element mounted on said camera for linear reciprocation, said abutment element being engageable with said slide only in the limiting exposure position of said slide; means coupling the shutter cocking member to said abutment element for movement of the latter toward the limiting viewing position of said slide responsive to actuation by the shutter cocking member, said abutment element thereby engaging said slide to move the same in the opposite direction from its limiting exposure position to its limiting viewing position; said slide, during movement in such opposite direction, returning said oscillatory member from its second position to its first position; and means, including said lost motion means, operable by slide during movement in such opposite direction, to move the mirror to its viewing position and the hood to its image aperture blocking position during an intermediate portion of the movement of said slide in such opposite direction.

2. Control mechanism according to claim 1, said last-named means, including said lost motion means, comprising a control cam carried by said slide, said control cam comprising two cam sections which are rectilinear and parallel in the direction of movement of said slide, but are arranged staggered relative to each other, and a third cam section connecting said two cam sections, a two-armed lever one arm of which is coupled to the mirrror and the hood, and a pin carried by the other arm of said lever, said pin operatively engaging said control cam.

3. Control mechanism according to claim 1, comprising releasable locking means for said shutter cocking member; means coupling said locking means and said means coupling said slide to the mirror and hood and operable to release said locking means when said slide is moved to its limiting viewing position; and means for automatically re-locking said locking means when said slide is moved to its limiting exposure position.

4. Control mechanism according to claim 1, in which said abutment element comprises a second slide mounted on said camera for linear reciprocation in alignment with the direction of reciprocation of said first mentioned slide; said second slide being substantially aligned with said first mentioned slide.

5. Control mechanism according to claim 4, said last-named means, including said lost motion means comprising a control cam carried by said first-mentioned slide, said control cam comprising two cam sections which are rectilinear and parallel in the direction of movement of said first-mentioned slide, but are arranged staggered relative to each other, and a third cam section connecting said two cam sections, a two-armed lever one arm of which is coupled to said mirror and said hood, and a pin carried by the other arm of said lever, said pin operatively engaging said control cam.

6. In a single lens reflex camera of the general type having a lens, an image aperture opposite said lens, a shutter mechanism having a released condition corresponding to exposure of light through said lens to said image aperture and a cocked condition corresponding to viewing condition of the camera, a viewer, a shutter release member for coupling to said shutter mechanism for picture exposure, and a shutter cocking member for coupling to said shutter mechanism for placing it in cocked condition; the improvement in control mechanism comprising a mirror mounted on said camera for movement between a viewing position, corresponding to the cocked condition of the shutter mechanism and in which the mirror reflects light passing through the lens to the viewer, and an exposure position, corresponding to the released condition of the shutter mechanism and in which the mirror is clear of the light passing through the lens to the image aperture; means biasing said mirror toward its exposure position; mirror blocking means mounted on said camera for movement between a first position operatively engaging said mirror to hold it in its viewing position and a second position disengaged from said mirror; a hood mounted on said camera for movement between an image aperture blocking position, when said mirror is in viewing position, and a viewer blocking position, when said mirror is in its exposure position; means biasing said hood to the viewer blocking position thereof; hood blocking means mounted on said camera and movable between a first position operatively engaging said hood and holding it in image aperture blocking position and a second position in which it is clear of said hood; said mirror blocking means and said hood blocking means, during movement from the second positions thereof toward the first positions thereof, being positioned and adapted to engage said mirror and said hood, respectively, to move them to their respective viewing position and image aperture blocking position; a slide mounted on said camera for linear reciprocation between a limiting viewing position and a limiting exposure position; an oscillatory member for coupling to the shutter mechanism and movable between a first position, corresponding to the cocked condition of the shutter mechanism, and a position corresponding to the released condition of the shutter mechanism; means coupling said oscillatory member to said slide to move said slide in a first direction from its limiting viewing position to its limiting exposure position as said oscillatory member is moved from its first position to its second position; lost motion means coupling said slide to said mirror blocking means and said hood blocking means and effective to move said mirror blocking means and said hood blocking means from their respective first positions to their respective second positions during an intermediate portion of the movement of said slide in said first direction; an abutment element mounted on said camera for linear reciprocation in a direction parallel to the direction of linear reciprocation of said slide, said abutment element being engageable with said slide only in the limiting exposure position of said slide; means coupling the shutter cocking member to said abutment element for movement of the latter toward the limiting viewing position of said slide responsive to actuation by the shutter cocking member, said abutment element thereby engaging said slide to move the same in the opposite direction to its limiting viewing position; said slide, during movement in such opposite direction, returning said oscillatory member from its second position to its first position; and coupling means, including said lost motion means, coupling said slide to said mirror blocking means and said hood blocking means and operable to move said mirror blocking means and said hood blocking means for their respective second positions to their respective first positions during an intermediate portion of the movement of said slide in such opposite direction.

7. Control mechanism according to claim 6, said last-named means comprising a control cam carried by said slide, said control cam comprising two cam sections which are rectilinear and parallel in the direction of movement of said slide, but are arranged staggered relative to each other, and a third cam section connecting said two cam sections; a two armed lever one arm of which is coupled to said mirror blocking means and hood blocking means; and a pin carried by the other arm of said lever, said pin operatively engaging said control cam.

8. Control mechanism according to claim 7, comprising releasable locking means for said shutter cocking member, means coupling said two armed lever to said locking means and operable to release said locking means when said slide is moved in said first direction; and means for automatically re-locking said locking means when said slide is moved to its limiting exposure position.

References Cited in the file of this patent

UNITED STATES PATENTS

| | | |
|---|---|---|
| 2,119,200 | Campbell | May 31, 1938 |
| 2,356,880 | Pignone | Aug. 29, 1944 |
| 2,550,698 | King et al. | May 1, 1951 |
| 2,655,847 | Harvey | Oct. 20, 1953 |
| 2,664,037 | Debrie | Dec. 29, 1953 |
| 2,916,978 | Härter et al. | Dec. 15, 1958 |